(12) United States Patent
Ryall et al.

(10) Patent No.: US 7,598,977 B2
(45) Date of Patent: Oct. 6, 2009

(54) SPATIO-TEMPORAL GRAPHICAL USER INTERFACE FOR QUERYING VIDEOS

(75) Inventors: Kathleen Ryall, Cambridge, MA (US); Qing Li, Blacksburg, VA (US); Alan W. Esenther, Ashland, MA (US)

(73) Assignee: Mitsubishi Electric Research Laboratories, Inc.

( * ) Notice: Subject to any disclaimer, the term of this patent is extended or adjusted under 35 U.S.C. 154(b) by 831 days.

(21) Appl. No.: 11/116,976

(22) Filed: Apr. 28, 2005

(65) Prior Publication Data

US 2006/0256210 A1 Nov. 16, 2006

(51) Int. Cl.
*H04N 7/18* (2006.01)
*G06K 9/00* (2006.01)
*G06K 9/34* (2006.01)

(52) U.S. Cl. .................. 348/143; 348/135; 382/107; 382/173

(58) Field of Classification Search ................ 382/107, 382/218, 173; 348/143, 135, 155, 231.2, 348/154; 375/240.26, 240.08
See application file for complete search history.

(56) References Cited

U.S. PATENT DOCUMENTS

| | | | | |
|---|---|---|---|---|
| 5,519,450 A | * | 5/1996 | Urbanus et al. | 348/600 |
| 5,579,028 A | * | 11/1996 | Takeya | 345/641 |
| 5,969,755 A | * | 10/1999 | Courtney | 348/143 |
| 6,919,892 B1 | * | 7/2005 | Cheiky et al. | 345/473 |
| 6,965,706 B2 | * | 11/2005 | Qian et al. | 382/305 |
| 7,106,275 B2 | * | 9/2006 | Brunner et al. | 345/32 |
| 2001/0043721 A1 | * | 11/2001 | Kravets et al. | 382/107 |
| 2003/0219146 A1 | * | 11/2003 | Jepson et al. | 382/103 |

OTHER PUBLICATIONS

Bederson, B. B. and Hollan, J. "Pad++: a zooming graphical interface for exploring alternate interface physics," Proceedings on UIST '94, pp. 17-26 1994.
Bier, E. A., Fishkin, K., Pier, K. and Stone, M. C. "Toolglass and magic lenses: the see-through interface," Proceedings of SIGGRAPH'93, pp. 73-80, 1993.
Daniel, G. and Chen, M. "Video visualization," Proceedings IEEE Visualization 2003, pp. 409-416.
Divakaran, A., Peker, K. A., Radharkishnan, R., Xiong, Z. and Cabasson, R. "Video Summarization Using MPEG-7 Motion Activity and Audio Descriptors," Video Mining, Rosenfeld, A.; Doermann, D.; DeMenthon, D., Oct. 2003.
Freeman, W., and Zhang, H. "Shape-Time Photography," Proceedings of CVPR 2003.
Hudson, S., Rodenstein, R. and Smith, I. "Debugging Lenses: A New Class of Transparent Tools for User Interface Debugging," Proceedings of UIST'97, pp. 179-187.
Long, A. C., Myers, B. A., Casares, J, Stevens, S. M. and Corbett, A. "Video Editing Using Lenses and Semantic Zooming," http://www-2.cs.cmu.edu/~silver/silver2.pdf, 2004.

(Continued)

*Primary Examiner*—Jason Chan
*Assistant Examiner*—Tuan H Le
(74) *Attorney, Agent, or Firm*—Dirk Brinkman; Gene Vinokur

(57) ABSTRACT

A method summarizes a video acquired of a scene spatially and temporally by specifying a spatial query and a temporal query. Frames of the video are selected according to the spatial query and the temporal query, and then the selected frames are composited into an image that represents spatial and temporal characteristics of the scene.

20 Claims, 2 Drawing Sheets

OTHER PUBLICATIONS

Mackay, W.E., and Beaudouin-Lafon, M. "DIVA: Exploratory Data Analysis with Multimedia Streams," Proceedings CHI'98, pp. 416-423, 1998.

Radhakrishnan, R., Xiong, Z., Divakaran, A. and Memon, N. "Time Series Analysis and Segmentation Using Eigenvectors for Mining Semantic Audio Label Sequences", IEEE International Conference on Multimedia and Expo (ICME), Jun. 2004.

Wittenburg, K., Forlines, C., Lanning, T., Esenther, A., Harada, S., Miyachi, T. "Rapid Serial Visual Presentation Techniques for Consumer Digital Video Devices", Proceedings of UIST 2003, pp. 115-124.

* cited by examiner

SPATIO-TEMPORAL GRAPHICAL USER INTERFACE FOR QUERYING VIDEOS

FIELD OF THE INVENTION

The present invention relates generally to processing videos, and more particularly to querying and presenting spatial and temporal characteristics of videos.

BACKGROUND OF THE INVENTION

Videos are available from a large number of sources, such as entertainment, sports, news, web, personal, home, surveillance, and scientific cameras. It is a problem to analyze and summarize such a wide variety of video content to locate interesting objects, events and patterns.

Automatic methods are known for extracting meta-data from videos. For example, video processing methods can detect, recognize, and track objects, such as people and vehicles. Most of those methods are designed for a particular genre of videos, for example, sports videos or newscasts. However, the number objects in a typical video can be large, and not all objects are necessarily associated with interesting events. Because of the complexity and variety of videos, it is often still necessary for users to further view videos and extracted meta-data to gain a better understanding of the context, i.e., spatial and temporal characteristics of the videos.

Typically, the videos or meta-data are manually processed either in space or alternatively in time. For example, a user might select a surveillance video acquired from a particular location, and then examine that video in detail only for a specific time interval to locate interesting events. Obviously, this requires some prior knowledge of the content, as well as the temporal dynamics of the scene in the video. It would be better if temporal and spatial characteristics of videos could be examined concurrently and automatically.

Therefore, there is a need for a method to analyze and manipulate videos and meta-data extracted from videos temporally and spatially by the automatic techniques. In particular, it is desired to provide improved visualization techniques that can reduce the amount of effort required to process videos and meta-data manually.

Video Summarization

Rendering video in space and time requires large processing, storage, and network resources. Doing this in real time is extremely difficult. Therefore, summaries and abstracts of the videos are frequently used. Video summarization is typically the first step in processing videos. In this step, features in the video are extracted and indexed. In general, summarization includes two processes: temporal segmentation and key-frame abstraction. Temporal segmentation detects boundaries between consecutive camera shots. Key-frame abstraction reduces a shot to one or a small number of indexed key-frames representative of the content. The key-frames can subsequently be retrieved by queries, using the index, and displayed for browsing purposes.

Commonly, the segmentation and abstraction processes are integrated. When a new shot is detected, the key-frame abstraction process is invoked, using features extracted during the segmentation process. The challenge is to generate a video summary automatically based on the context.

Summarization methods can either rely on low-level features such as color, e.g., brightness and dominant color, and motion activity, or more advanced semantic analysis such as object and pattern detection. While those methods are useful and powerful, they are inadequate for real-time analysis.

Video Visualization

Visualization methods commonly combine video frames and extracted information, e.g., meta-data. The meta-data are usually associated with individual frames, and can include bounding boxes for objects and motion vectors.

One method arranges a spatial view in the center of a display and temporal summarized views on the sides to simulate a 3D visualization that gives a sense of the past and future, Mackay, W. E., and Beaudouin-Lafon, M., "DIVA: Exploratory Data Analysis with Multimedia Streams," Proceedings CHI'98, pp. 416-423, 1998. That method requires a large display screen and meta-data, and can only visualize data from one temporal direction, e.g., either the past or the future.

In another method, the user selects key-frames, and the video is presented temporally as a 'time tunnel' to quickly locate interesting events, Wittenburg, K., Forlines, C., Lanning, T., Esenther, A., Harada, S., Miyachi, T, "Rapid Serial Visual Presentation Techniques for Consumer Digital Video Devices", Proceedings of UIST 2003, pp. 115-124, and [CS-3124]. While that method provides convenient presentation and navigation methods for videos, that method does not support queries.

Another method summarizes a video using opacity and color transfer functions in volume visualization, Daniel, G., and Chen, M. "Video visualization," Proceedings IEEE Visualization 2003, pp. 409-416, 2003. The color transfer functions indicate different magnitudes of changes, or can be used to remove parts of objects. That method also requires meta-data.

Another method presents spatial relationships over time in a single image, Freeman, W., and Zhang, H. "Shape-Time Photography," Proceedings of CVPR 2003, pp. 2003. That method requires a stationary stereo camera.

Another method presents the user with a detailed and view using successive timelines, Mills, M., Cohen, J. and Wong, Y. "A Magnifier Tool for Video Data," SIGCHI '92: Proceedings of Human Factors in Computing Systems, Monterey, C A, pp. 93-98, 1992. The method uses a timeline to represent a total duration of a video, and the user can select a portion of the timeline and expand the selected portion to a second timeline. The timelines provide an explicit spatial hierarchical structure for the video.

Still Image Visualizations

Many techniques are used to visualize and understand still images. One method provides a 'see-through' interface called a 'magic lens', Bier, E. A., Fishkin, K., Pier, K., and Stone, M. C. "Toolglass and magic lenses: the see-through interface," Proceedings of SIGGRAPH'93, pp. 73-80, 1993. A magic lens is applied to a screen region to semantically transform the underlying content as expressed by the pixels of the still image. The user moves the lens to control what region is affected. In practice, the magic lens is a composable visual filter that can be used for interactive visualization. The lens can act as a magnifying glass, zooming in on the underlying content. The lens can also function as an 'x-ray' tool to reveal otherwise hidden information. Multiple lenses can be stacked on top of one another to provide a composition of the individual lens functions. Different lens ordering can generate different result. The magic lens reduces screen space and provides the ability to view the entire context and detail of the still image concurrently. The lens enhances interesting information while suppressing distracting information.

The magic lens has been used in many applications, Bederson, B. B., and Hollan, J. "Pad++: a zooming graphical interface for exploring alternate interface physics," Proceedings of UIST '94, pp. 17-26, 1994, Hudson, S., Rodenstein, R. and Smith, I. "Debugging Lenses: A New Class of Transparent Tools for User Interface Debugging," Proceedings of UIST'97, pp. 179-187, and Robertson, G. G., and Mackinlay, J. D. "The document lens," UIST'93, pp. 101-108, 1993.

However, the prior art magic lenses operate only in the spatial domain. It is desired to provide a magic lens that can operate concurrently in both the spatial and the temporal domain.

SUMMARY OF THE INVENTION

A method for querying and browsing videos using spatial and temporal components of the videos is provided. The method summarizes a video acquired of a scene spatially and temporally by specifying a spatial query and a temporal query. Frames of the video are selected according to the spatial query and the temporal query. Then, the selected frames are composited into an image that represents spatial and temporal characteristics of the scene.

DETAILED DESCRIPTION OF THE PREFERRED EMBODIMENT

Figure 1:
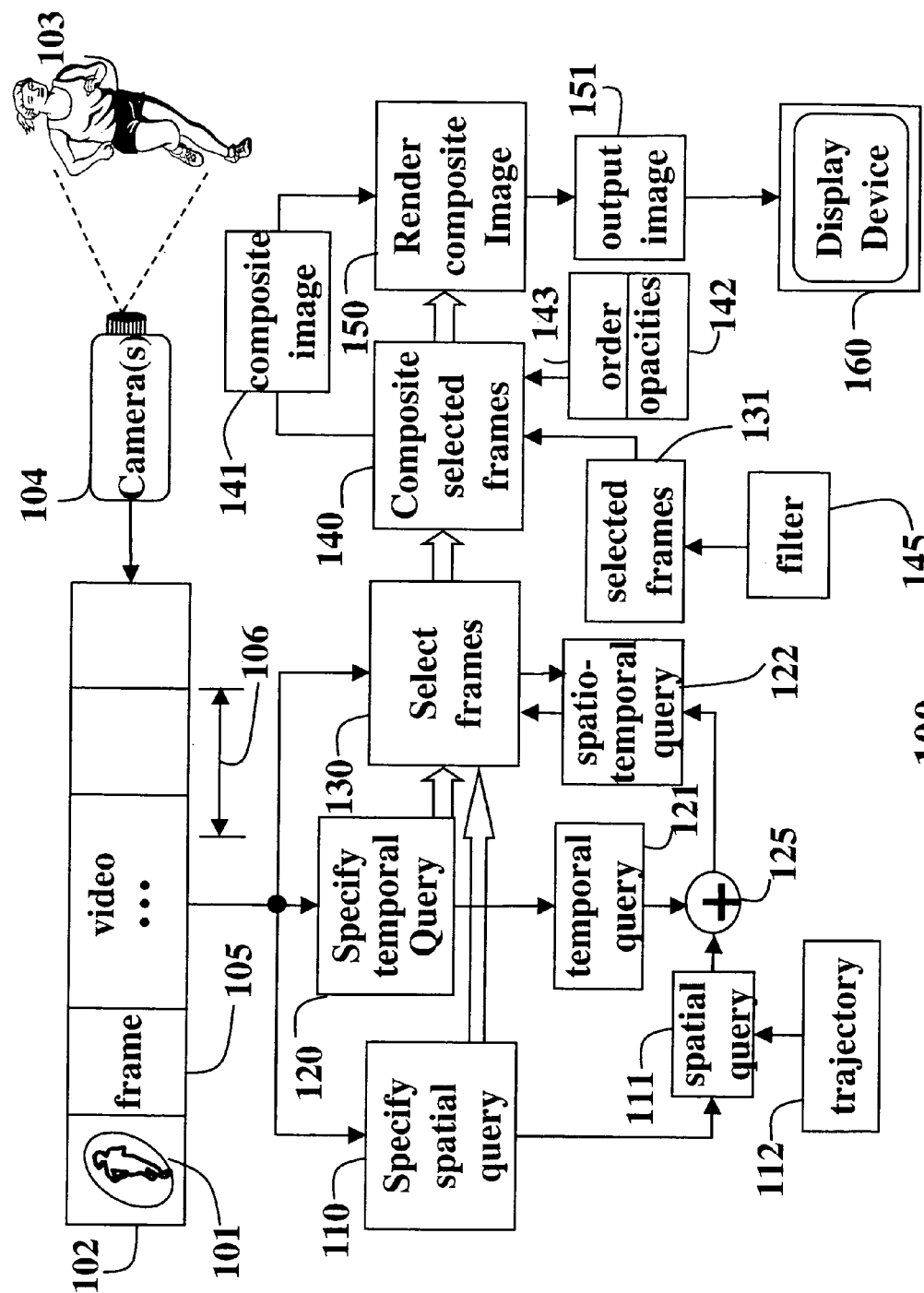
FIG. 1 is a block diagram of a system and method for querying and presenting spatial and temporal characteristics of videos.

FIG. 1 shows a system and method 100 according to one embodiment of our invention for analyzing, querying, browsing, and presenting a 102 video using spatial and temporal characteristics of the video. This embodiment combines spatial and temporal query components into a single query. The queries are used to select a spatial region and a temporal region of the video. The spatial region is a spatially contiguous set of pixels within a frame, and the temporal regions extend over temporally contiguous pixels in multiple adjacent frames. Then, the system presents a composite image that summarizes spatial and temporal characteristics of the selected regions.

Spatial Query

As shown in FIG. 1, a spatial query 111 specifies 110 a spatial region 101 of interest in the video 102 of a scene 103 acquired by one or more stationary or moving cameras 104. It should be noted that the video can be acquired and processed in real-time, or the video can be stored, and the archived video can be 'browsed' off-line at some later time.

The user can select the spatial region manually, e.g., by 'drawing' on a frame 105 with a mouse and cursor, stylus, or other input device. Alternatively, the system can specify the region automatically using object, event, color detection, or other techniques.

Temporal Query

A temporal query 121 specifies 120 a temporal region 106 of interest in the video, e.g., a starting time, and an ending time or duration. The spatial query can also be specified 120 according to indexed frames. The temporal region can be selected automatically or manually. The user can select the temporal region manually by specifying start and stop times of the temporal region of interest, along with the number of total frames to consider. Alternatively, the system can specify the region automatically using moving object, event, color or motion detection techniques. For example, the temporal region includes the frames in which a particular object appears.

The temporal query can also be specified in terms of a trajectory to constrain the spatial query. The trajectory can be specified by a directed line 213, see FIG. 2. The trajectory specifies a spatial region of interest and a pattern of movement so only frames including moving objects with similar trajectories are selected.

It should be noted that the spatial and temporal queries can be specified in any order or in parallel.

The spatial query and the temporal query can be combined 125 into a spatio-temporal query 122. The spatio-temporal query is used to select 130 frames 131 from the video. The selected images can be filtered 145 according to the number of moving objects detected in the frames, for example. Frames without objects can be discarded as they only show the background and do not contribute any new information to the user. The exclusion of 'empty' frames improves the view by minimizing blurring or fading of the context.

Compositing and Rendering

We generate 140 a composite image 141 for rendering by 'blending' the selected frames. The composite image summarizes the spatial and temporal characteristics of the selected frames. When compositing 140 the selected frames, a predetermined order 143 and predetermined blending opacities 142 determine the appearance of the composite image. The composite image can be rendered 150 as an output image 151 on a display device 160.

The composite image includes regions of the selected frames over time, i.e., multiple frames. The user can distinguish which regions come from which period of time. The user can then further explore that time period in greater detail.

Setting appropriate opacities for the selected frames is non-trivial when multiple sequential frames are composited. Conventional methods typically composite spatially fixed and unrelated images, Harrison, B. L., Ishii, H., Vicente, K. and Buxton, W. "Transparent Layered User Interfaces: An Evaluation of a Display Design Space to Enhance Focused and Divided Attention," Proceedings of CHI'05, pp. 317-324, 1995, and Zhai, S., Buxton, W. and Milgram, P. "The partial-occlusion effect: Utilizing semi-transparency in 3D human-computer interaction," ACM Transactions on Computer-Human Interaction, 3(3), pp. 254-284, 1996.

However, our frames are also temporally related. It is desired to make a frame of interest clearer while playing back video. To do this, we interpolate frames. Given the starting and ending time period, and the number of frames to composite, we determine a time interval between consecutive selected frames.

We determine the opacities using the Equations (1) and (2) and the overlaying order so that all images can be perceived with the same opacity value:

$$\sum_{i=1}^{n} \alpha_i \times \frac{i}{n} = 1, \text{ and} \quad (1)$$

$$\alpha_i \times \frac{i}{n} = \alpha_j \times \frac{j}{n} \text{ for all } i \neq j, \quad (2)$$

where $\alpha_i$ is the opacity for an $i^{th}$ layer in the composite image, n represents the number of selected images, and i/n represents the weight of $\alpha_i$. The multiplication 'x' provides a heuristic value, i.e., the user perceived value, for a certain layer. The condition when the user perceived all composite frames with the same opacity level is defined as a balanced view. Thus, we solve $\alpha_i=1/i$. The equations maintain a continuous transparency spectrum, from the most recent frame, to a balanced view, and then to the oldest frame. The order of the compositing can be changed to better understand the temporal structure of the video.

For example, when compositing two frames, both frames are seen as clear as possible when the opacity value for the bottom frame is 1.0 and the opacity value for the top frame is 0.5. Then, the composite image is perceived as having an opacity of 0.5. With three frame, the composite image appear to be equally weighted when in fact the frames are weighted with $\alpha=1.0$ for the bottom frame, 0.5 for the middle frame, and 0.33 for the top frame. Starting from the balanced view, the users can decide which frame, most recent or oldest should be most distinguished changing the opacity values.

Graphical User Interface

Figure 2:
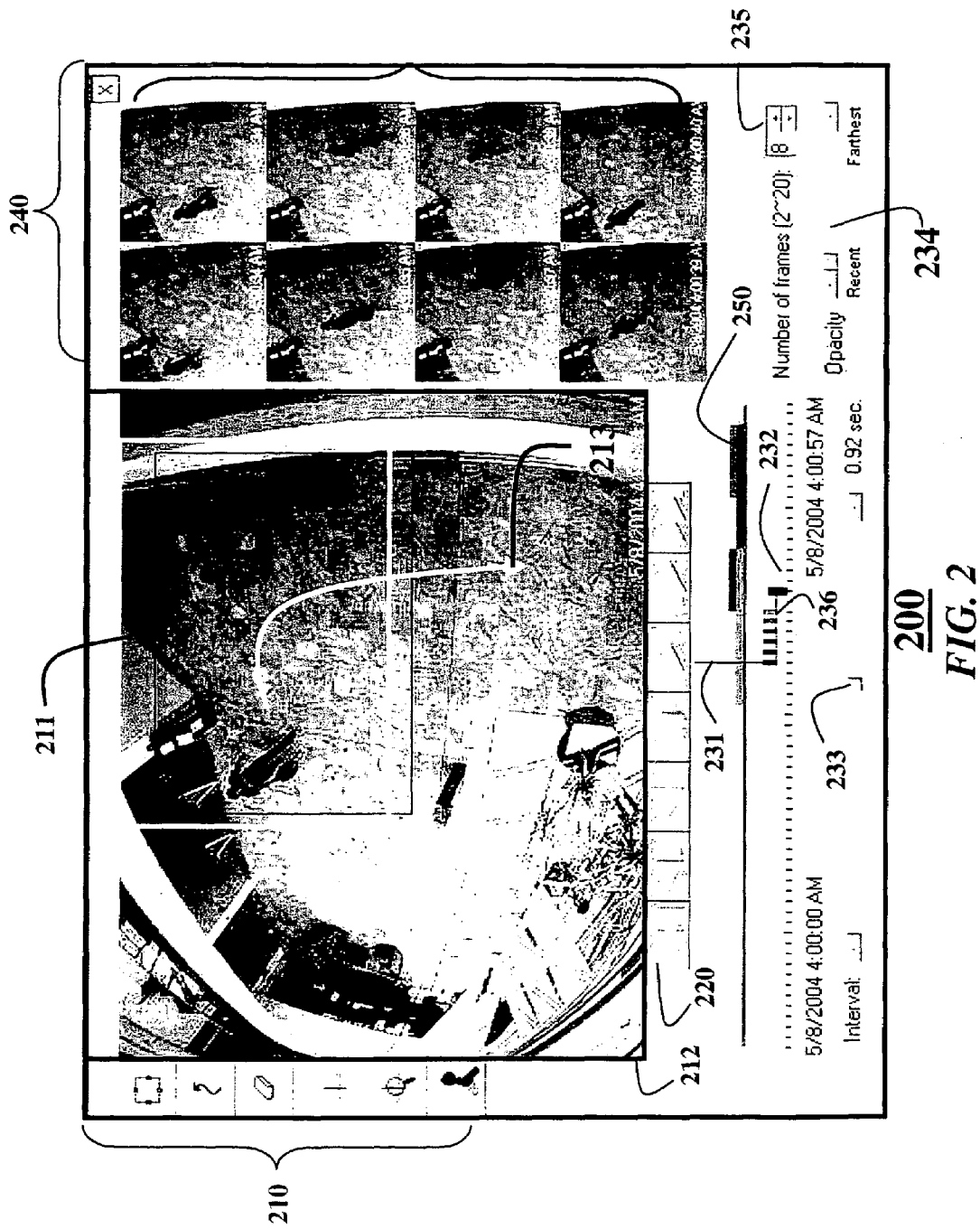
FIG. 2 is a block diagram of a spatio-temporal graphical user interface according to one embodiment invention.

FIG. 2 shows a graphical user interface (GUI) 200 according to one embodiment of the invention. The interface includes icons 110 for specifying the spatial query, e.g., virtual buttons. For example, the user can draw a rectangles 211 around a spatial region in a frame displayed in a play back window 212 of the video displayed on the left side of the interface.

Small vertical bars 236 show the temporal location of these frames. The inter-bar spacing indicates relative temporal positions, and the gray-levels of the bars indicate their relative opacities for compositing. In this example, the frames are spaced evenly. Recent frames are more heavily weighted by the opacities to make them clearer in the composite image. The order, opacities, and inter-frame spacing are described in greater detail below.

For the compositing, the interface includes a time pointer 231 indicating the current frame or starting time. The user can move this pointer, or the pointer moves automatically as the video is played back. A duration bar 231 is used to specify length of time period. The time period specified can span the current frame into the past and the future. The number of frames that are selected can also be shown.

An interval scrollbar 233 specifies the temporal query. The interval scroll bar is used to compress time and to 'zoom' in on a particular time period. That is, the interval bar controls a sampling of the video. For example, if the interval is set to ten, only every tenth frame is process, and an hour video can be viewed in six minutes. Thus, the interval scroll bar functions as a fast-forward.

An opacity bar 234 determines the relative opacities for the frames during the blended compositing. The blending gives a 'ghosting' effect as a preview of "future" or "past" events. For example, moving object in the past appear as transparent 'ghosts' while the object at the present location is shown clearly. Thus, it is possible where moving objects where in the past, now, and the future.

Thumbnail images 240 of the selected frames can be displayed on the right side of the interface. In the example shown, eight frames are composited. The user can interact with the thumbnail images using a mouse. Selecting a particular thumbnail plays back the video from that point, with colored rectangles consistent with the object histogram, around any moving objects in the frames.

An object histogram 250 indicates the number of moving objects, and when the objects occur in the video. The heights of the histograms indicate the number of objects, and different colors distinguish the different objects. Selecting one of the histograms positions the video to play back the frames including the object in the play back window 212.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for summarizing a video spatially and temporally, comprising:
   specifying a spatial query for a video acquired of a scene by a camera, in which the spatial query specifies a spatially contiguous set of pixels within a particular frame of the video;
   specifying a temporal query for the video, in which the temporal query specifies a temporally contiguous set of pixels in multiple adjacent frames;
   selecting frames of the a video according to the spatial query and the temporal query; and
   compositing the selected frames into an image that represents spatial and temporal characteristics of the scene, in which the compositing is according to a predetermined order and predetermined opacities, in which the compositing is according to:

$$\sum_{i=1}^{n} \alpha_i \times \frac{i}{n} = 1, \text{ and } \alpha_i \times \frac{i}{n} = \alpha_j \times \frac{j}{n} \text{ for all } i \neq j,$$

where $\alpha_i$ is an opacity for an $i^{th}$ layer in the image, and n represents a number of selected images.

2. The method of claim 1, further comprising:
   acquiring the video with a stationary camera.

3. The method of claim 1, further comprising:
   acquiring the video with a moving camera.

4. The method of claim 1, further comprising:
   drawing on the particular frame to specify the spatial query manually.

5. The method of claim 1, further comprising:
   applying object detection to the particular frame to specify the spatial query automatically.

6. The method of claim 1, further comprising:
   applying event detection to the particular frame to specify the spatial query automatically.

7. The method of claim 1, further comprising:
   applying color detection to the particular frame to specify the spatial query automatically.

8. The method of claim 1, further comprising:
   specifying a starting time and an ending time for the spatial region of interest manually.

9. The method claim 1, in which the temporal region is specified automatically by moving object detection.

10. The method of claim 1, in which the temporal region is specified according to a trajectory of a moving object.

11. The method of claim 1, further comprising:
    combining the spatial query and the temporal query into a spatio-temporal query to select the frames.

12. The method of claim 1, further comprising:
    filtering the selected frames.

13. The method of claim 12, in which the filtering is according to a number of moving objects detected in the selected frames.

14. The method of claim 1, further comprising:
    rendering the image on an output device.

15. The method of claim 14, in which the spatial query and the temporal query are specified with a graphical user interface.

16. The method of claim 15, further comprising:
    displaying thumbnail images of the selected frames on the graphical user interface.

17. The method of claim 15, further comprising:
displaying an object histogram on the graphical user interface to represent moving objects in the selected frames.

18. The method of claim 1, in which the video is processed in real-time.

19. The method of claim 1, in which the video is processed off-line.

20. A system for summarizing a video spatially and temporally, comprising:
means for specifying a spatial query for a video acquired of a scene by a camera, in which the spatial query specifies a spatially contiguous set of pixels with a particular frame of the video;
means for specifying a temporal query for the video, in which the temporal query specifies a temporally contiguous set of pixels in multiple adjacent frames;
means selecting frames of the a video according to the spatial query and the temporal query; and
means compositing the selected frames into an image that represents spatial and temporal characteristics of the scene, in which the compositing is according to a predetermined order and predetermined opacities, in which the compositing is according to:

$$\sum_{i=1}^{n} \alpha_i \times \frac{i}{n} = 1, \text{ and } \alpha_i \times \frac{i}{n} = \alpha_j \times \frac{j}{n} \text{ for all } i \neq j,$$

where $\alpha_i$ is an opacity for an $i^{th}$ layer in the image, and n represents a number of selected images.

* * * * *